United States Patent [19]

Howkins

[11] Patent Number: 4,593,291

[45] Date of Patent: Jun. 3, 1986

[54] METHOD FOR OPERATING AN INK JET DEVICE TO OBTAIN HIGH RESOLUTION PRINTING

[75] Inventor: Stuart D. Howkins, Ridgefield, Conn.

[73] Assignee: Exxon Research and Engineering Co., Florham Park, N.J.

[21] Appl. No.: 600,786

[22] Filed: Apr. 16, 1984

[51] Int. Cl.[4] .......... G01D 15/18

[52] U.S. Cl. .......... 346/1.1; 346/140 R

[58] Field of Search .......... 346/140, 75, 1.1; 239/102

[56] References Cited

U.S. PATENT DOCUMENTS

| | | | |
|---|---|---|---|
| 4,112,433 | 9/1978 | Vernon | 346/140 X |
| 4,161,670 | 7/1979 | Kern | 346/140 X |
| 4,459,601 | 7/1984 | Howkins | 346/140 |
| 4,533,082 | 8/1985 | Maehara | 346/140 X |
| 4,546,361 | 10/1985 | Brescia | 346/140 |

*Primary Examiner*—Joseph W. Hartary
*Attorney, Agent, or Firm*—Kenneth Watov

[57] ABSTRACT

The volume of the ink chamber of an ink jet device is rapidly expanded for pulling back into the chamber from an orifice a meniscus of ink, for forming a cusp shaped disturbance on the meniscus, thereby causing a relatively small droplet of ink to form and break off from the meniscus, and be ejected or propelled out of the orifice.

11 Claims, 6 Drawing Figures

METHOD FOR OPERATING AN INK JET DEVICE TO OBTAIN HIGH RESOLUTION PRINTING

The field of the present invention relates generally to ink jet apparatus, and more specifically to a method for operating an ink jet apparatus for providing high resolution printing as, for example, may be necessary in printing pictures of photographic quality.

The design of practical ink jet devices and apparatus for producing a single droplet of ink on demand is relatively new in the art. In prior drop-on-demand ink jet apparatus, the volume of each individual ink droplet is typically dependent upon the geometry of the ink jet apparatus, the type of ink used, and the magnitude of a positive pressure force developed within the ink chamber of the ink jet for ejecting an ink droplet from an associated orifice. The effective diameter and design of the orifice, the volume and configuration of the ink chamber associated with the orifice, the transducer design, and the method of coupling the transducer to the ink chamber, are other factors determining the volume of individual ink droplets ejected from the orifice. In any such ink jet apparatus high resolution imaging requires that relatively small or low volume ink droplets be ejected from the apparatus. Typically, such smaller sized ink droplets are obtained by decreasing the diameter of the orifices of the ink jet device. However, it is difficult to fabricate small diameter jet orifices, and the operation of an ink jet device incorporating such small diameter orifices is typically plagued with orifice clogging problems (by dried ink, contaminants in the ink, paper dust, etc.), adverse effects of a high ratio of surface tension forces to inertial forces, poor aim, and so forth.

The present inventor discovered that by operating an ink jet device for rapidly pulling back from an orifice a meniscus of ink, the surface resonances of the meniscus can be excited in a manner to form a cusp shaped disturbance at the center of the meniscus which breaks off and is ejected from the orifice as a very small droplet. The ink droplets so obtained typically have average diameters that are about 20% of the diameter of the orifice from which they were ejected, and a correspondingly smaller volume relative to ink droplets ejected from the same orifice using conventional methods of operating a ink jet, whereby positive pressures are produced for "pushing" a droplet of ink out of an orifice (the droplet so produced having an average diameter substantially equivalent to the diameter of the orifice immediately upon ejection of the droplet). By operating an ink jet device in an iterative manner for producing such relatively small volume and diameter ink droplets via the method of the present invention, very high resolution printing is obtained, while overcoming the problems in the prior art.

In the drawing, wherein like items have common reference designations:

Figure 1:
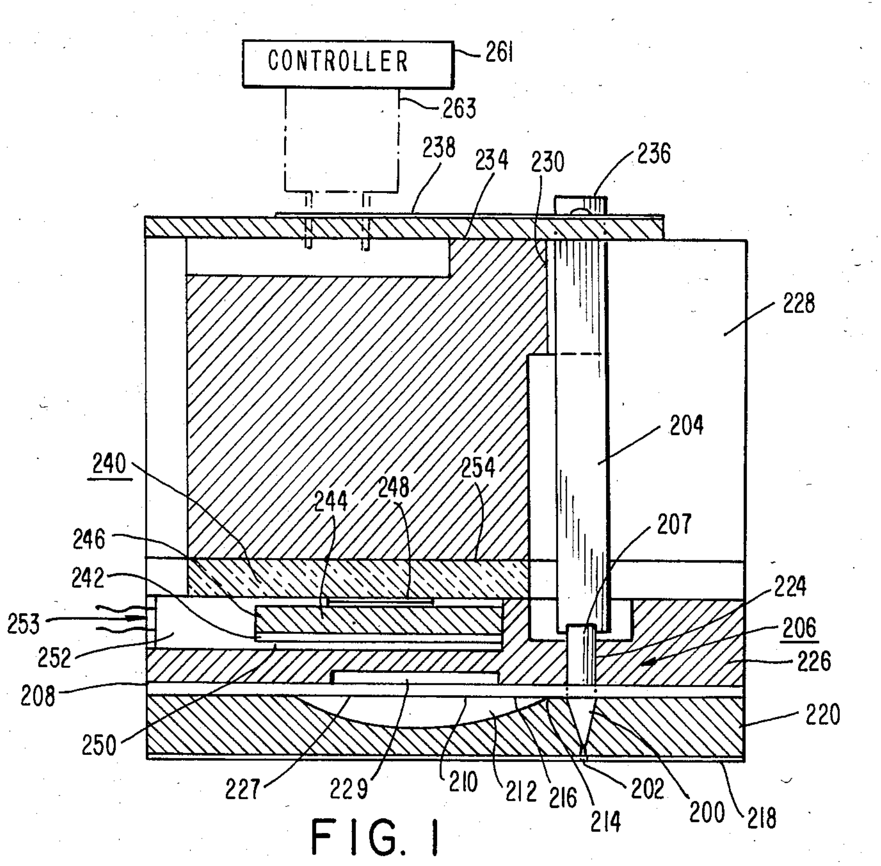
FIG. 1 is a sectional view of an illustrated ink jet apparatus.

In another variation, the transducer foot 207 is coupled directly to the ink in the chamber 200 without using a diaphragm 210 and visco-elastic material 208. In this case ink is prevented from leaking past the foot 207 by a visco-elastic potting compound which seals the annular gap between the foot 207 and inside diameter of hole 224.

Figure 4:
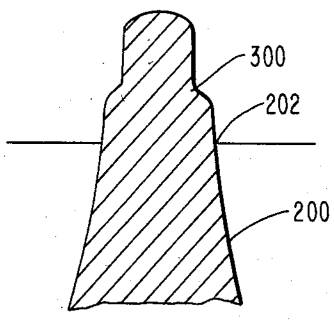
Figure 5:
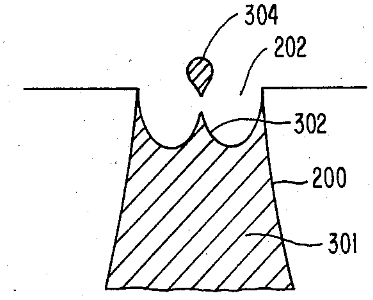
Figure 6:
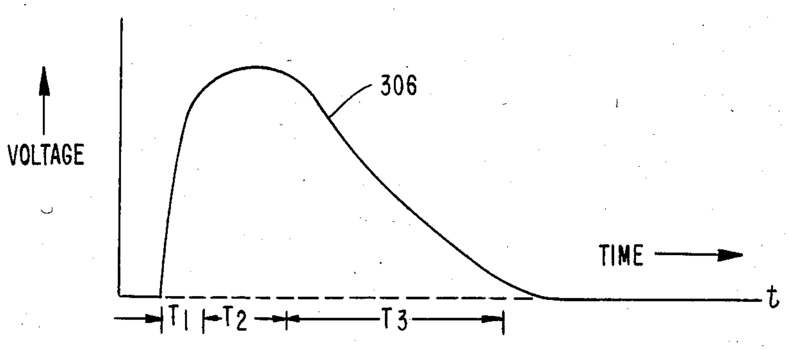

FIG. 4 is a cross-sectional view showing on orifice and associated ink chamber of the illustrated device being operated in a conventional manner for producing an ink droplet;

FIG. 5 is a cross-sectional view of an orifice and associated ink chamber of the illustrated ink jet apparatus operable in one embodiment of the present invention for producing a relatively small ink droplet; and FIG. 6 shows the wave shape for electrical pulses of one embodiment of the invention.

Figure 2:
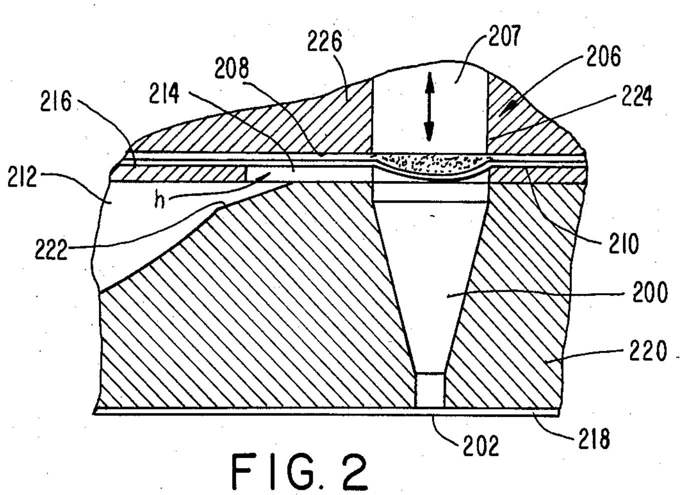
FIG. 2 is an enlarged view of a portion of the section of FIG. 1.
Figure 3:
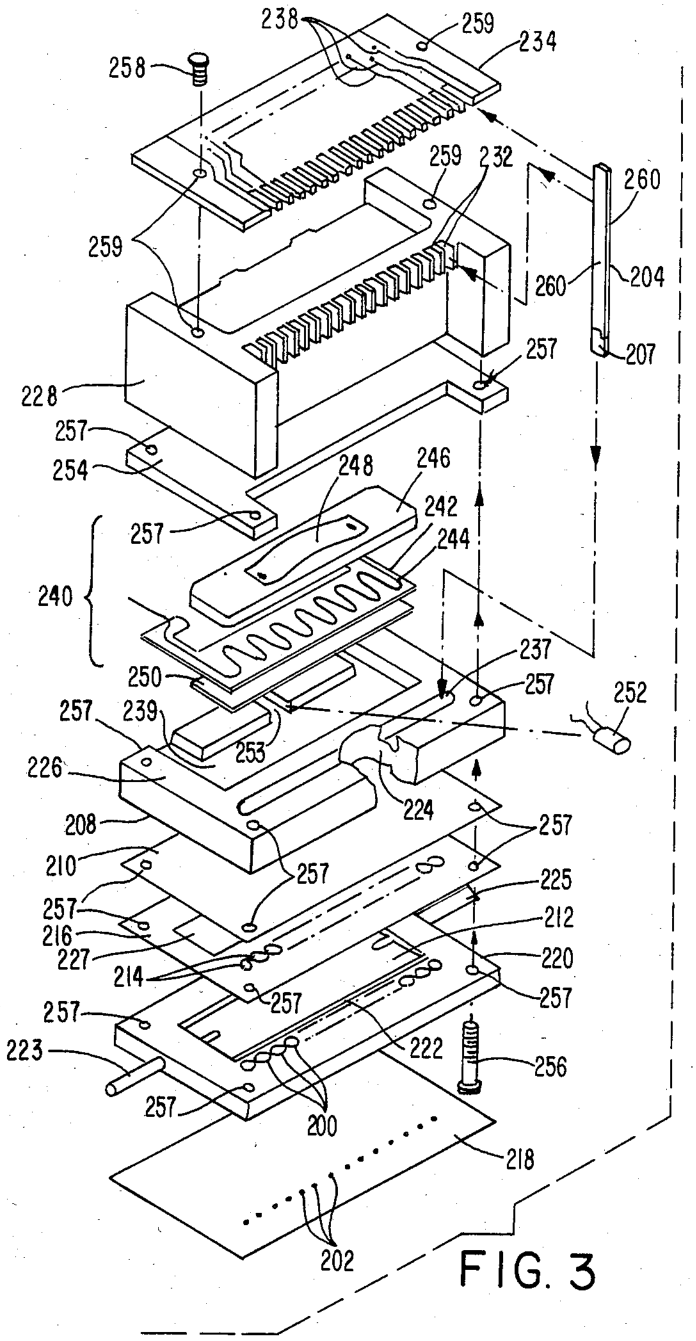
FIG. 3 is an exploded projectional or pictorial view of the ink jet apparatus, including the embodiments shown in FIGS. 1 and 2.

In FIGS. 1–3, an ink jet apparatus of co-pending application Ser. No. 336,603, filed Jan. 4, 1982, now U.S. Pat. No. 4,459,601 for "Improved Ink Jet Method and Apparatus" is shown (the invention thereof is assigned to the assignee of the present invention), and incorporated herein by reference. The present invention was discovered during development of improved methods for operating the previously mentioned ink jet apparatus for obtaining high resolution printing. However, the present inventor believes that the various embodiments of his invention illustrated and claimed herein are applicable for use with a broad range of ink jet apparatus (especially drop-on-demand ink jet apparatus). Accordingly, the ink jet apparatus discussed herein is presented for purposes of illustration of the method of the present invention, and is not meant to be limiting. Also, only the basic mechanical features and operation of this apparatus are discussed in the following paragraphs, and reference is made to the previously mentioned application for greater details concerning this apparatus. The reference designations used in FIGS. 1–5 are substantially the same as used in the co-pending application, in order to facilitate any referencing back to that application or the patent that may issue therefrom.

With reference to FIGS. 1–3, the illustrative ink jet apparatus includes a chamber 200 having an orifice 202 for ejecting droplets of ink in response to the state of energization of a transducer 204 for each jet in an array of such jets (see FIG. 3). The transducer 204 expands and contracts (in directions indicated by the arrows in FIG. 2) along its axis of elongation, and the movement is coupled to the chamber 200 by coupling means 206 which includes a foot 207, a visco-elastic material 208 juxtaposed to the foot 207, and a diaphragm 210 which is preloaded to the position shown in FIGS. 1 and 2.

In another variation, the transducer foot 207 is coupled directly to the ink in the chamber 200 without using a diaphragm 210 and visco-elastic material 208. In this case ink is prevented from leaking past the foot 207 by a visco-elastic potting compound which seals the annular gap between the foot 207 and inside diameter of hole 224.

Ink flows into the chamber 200 from an unpressurized reservoir 212 through restricted inlet means provided by a restricted opening 214. The inlet 214 comprises an opening in a restrictor plate (see FIG. 3). As shown in FIG. 2, the reservoir 212 which is formed in a chamber plate 220 includes a tapered edge 222 leading into the inlet 214. As shown in FIG. 3, the reservoir 212 is supplied with a feed tube 223 and a vent tube 225. The reservoir 212 is compliant by virtue of the diaphragm 210, which is in communication with the ink through a large opening 227 in the restrictor plate 216 which is juxtaposed to an area of relief 229 in the plate 226.

One extremity of each one of the transducers 204 is guided by the cooperation of a foot 207 with a hole 224 in a plate 226. As shown, the feet 207 are slideably retained within the holes 224. The other extremities of each one of the transducers 204 are compliantly mounted in a block 228 by means of a compliant or elastic material 230 such as silicon rubber. The compliant material 230 is located in slots 232 (see FIG. 3) so as to provide support for the other extremities of the transducers 204. Electrical contact with the transducers 204 is also made in a compliant manner by means of a compliant printed circuit 234, which is electrically coupled by suitable means such as solder 236 to an electrode 260 of the transducers 204. Conductive patterns 238 are provided on the printed circuit 234.

The plate 226 (see FIGS. 1 and 3) includes holes 224 at the base of a slot 237 which receive the feet 207 of the transducers 204, as previously mentioned. The plate 226 also includes a receptacle 239 for a heater sandwich 240, the latter including a heater element 242 with coils 244, a hold down plate 246, a spring 248 associated with the plate 246, and a support plate 250 located immediately beneath the heater 240. The slot 253 is for receiving a thermistor 252, the latter being used to provide monitoring of the temperature of the heater element 242. The entire heater 240 is maintained within the receptacle in the plate 226 by a cover plate 254.

As shown in FIG. 3, the variously described components of the ink jet apparatus are held together by means of screws 256 which extend upwardly through openings 257, and screws 258 which extend downwardly through openings 259, the latter to hold a printed circuit board 234 in place on the plate 228. The dashed lines in FIG. 1 depict connections 263 to the printed circuits 238 on the printed circuit board 234. The connections 263 connect a controller 261 to the ink jet apparatus, for controlling the operation of the latter.

In conventional operation of the ink jet apparatus, the controller 261 is programmed to at an appropriate time, via its connection to the printed circuits 238, apply a voltage to a selected one or ones of the hot electrodes 260 of the transducers 204. The applied voltage causes an electric field to be produced transverse to the axis of elongation of the selected transducers 204, causing the transducers 204 to contract along their elongated axis. When a particular transducer 204 so contracts upon energization, the portion of the diaphragm 210 located below the foot 207 of the transducer 204 moves in the direction of the contracting transducer 204, thereby effectively expanding the volume of the associated chamber 200. As the volume of the particular chamber 200 is so expanded, a negative pressure is initially created within the chamber, causing ink therein to tend to move away from the associated orifice 202, while simultaneously permitting ink from the reservoir 212 to flow through the associated restricted opening or inlet 214 into the chamber 200. The amount of ink that flows into the chamber 200 during the refill is greater than the amount that flows back out through the restrictor 214 during firing. The time between refill and fire is not varied during operation of the jet thus providing a "fill before fire" cycle. Shortly thereafter, the controller 261 is programmed to remove the voltage or drive signal from the particular one or ones of the selected transducers 204, causing the transducer 204 or transducers 204 to return to their de-energized or elongated states. Specifically, the drive signals are terminated in a step like fashion, causing the transducers 204 to very rapidly expand along their elongated axis, whereby via the visco-elastic material 208 the feet 207 of the transducers 204 push against the area of the diaphragm 210 beneath them, causing a rapid contraction or reduction of the volume of the associated chamber or chambers 200. In turn, this rapid reduction in the volume of the associated chambers 200, creates a pressure pulse or positive pressure disturbance within the chambers 200, causing an ink droplet to be ejected from the associated orifices 202. Note that when a given transducer 204 is so energized, it both contracts or reduces its length and increases its thickness. However, the increase in thickness is of no consequence to the illustrated ink jet apparatus, in that the changes in length of the transducer control the operation of the individual ink jets of the array. Also note, that with present technology, by energizing the transducers for contraction along their elongated axis, accelerated aging of the transducers 204 is avoided, and in extreme cases, depolarization is also avoided.

With reference to FIG. 4, in operating the illustrated ink jet apparatus as previously described, as an ink droplet 300 leaves an orifice 202, the average diameter of the ink droplet 300 is that of the orifice 202. In this example, the present inventor experimented with the illustrative ink jet device having orifice diameters ranging from 0.002 inch to 0.003 inch. As shown in FIG. 5, he discovered that when he operated a transducer 204 to rapidly contract, thereby causing very rapid expansion of the volume of the associated ink chamber 200, results in a very rapid drawback of the ink 301 away from the orifice 202 back into the chamber 200. Such rapid drawback of the meniscus causes a cusp shaped disturbance 302 to form on the meniscus of the ink 301, whereby a small ink droplet 304 is formed and ejected from the orifice 202. It is believed that the rapid drawback excites surface resonances on the meniscus, causing formation of disturbance 302 and ejection of droplet 304. Also, it was discovered that for optimal operation, the expanded volume of the chamber 200 should be maintained for a period of time greater than one-half the period of the meniscus oscillations. The meniscus oscillation period may be determined by the Helmholtz resonance, the transducer resonance or other fluidic or structural resonances depending upon the design of the device. As shown, the ink droplet 304 breaks off from the cusp shaped disturbance 302 during a rapid drawback of the ink. In laboratory tests, it was determined that the ink droplets 304 so formed have an average diameter that is about 20 percent that of the orifice diameter. Accordingly, in this example, the ink droplets so produced using the method of the invention were observed to have average diameters ranging from 0.0004 to 0.0006 inch. After so ejecting an ink droplet 304, the transducer 204 is operated to slowly return to its elongated state in order to avoid the ejection of an ink droplet due to chamber pressures resulting from a more rapid elongation of the transducer 204. Howver, in certain applications, it may be desirable to intermix or use a combination of ink droplets produced in both the conventional and drawback modes of operation in order to provide a desired printing effect. By operating an ink jet device in a repetitive manner using the method of the present invention, very high, photographic quality resolution printing is obtainable.

In FIG. 6, the waveshape 306 of the electrical drive pulses applied to the transducers 204 of the illustrative ink jet device for producing ink droplets 304 is shown. The slope of the leading edge of the drive pulse 306 is relatively steep for causing very rapid contraction of the transduder 204 to which the pulse 306 is applied, thereby insuring very rapid drawback of the ink 301 from the orifice 202 for the production of a small ink droplet 304, as previously described. The trailing edge of the drive pulse 306 has a very gradual slope relative to the leading edge, in order to insure a relatively slow elongation of the energized transducer 204 as it is returned from its fully energized to its de-energized state. In this manner, the positive pressure pulse produced within the associated ink chamber 200 is maintained below a magnitude that would cause an ink droplet to be ejected from the orifice 202 during de-energization of the transducer 204. Also, in this manner, refill of the ink chamber 200 is effected as previously described for conventional operation of the illustrative ink jet apparatus. Typically, $T_1$ is 1.0 to 30.0 microseconds, $T_2$ is 0 to 5.0 microseconds, and $T_3$ is 10.0 to 200 microseconds. Also, if at various times during the operation of the ink jet apparatus it is desired to eject larger ink droplets, perhaps interdispersed with the small ink droplets produced by the method of the present invention, the invention also includes making the trailing slope of the drive pulse faster or steeper, in order to fire an ink droplet upon de-energiztion of the transducer 204. In addition, certain of the drive pulses could be shaped in the conventional manner, whereby the slope of the leading edge of the pulse is designed for preventing the ejection of the ink droplet 304 during contraction of the transducer 204, and the trailing edge for ejection of an ink droplet 300 as shown in FIG. 4, as previously described. In other words, the ink jet apparatus can be operated in any desired manner, including interdispersing drive pulses of appropriate shape for one time operating the ink jet apparatus in a conventional manner, and at another time operating the ink jet apparatus for producing the small ink droplets 304, in order to provide desired modes of printing.

The method of operation of an ink jet device of the present invention permits small droplets of ink 304 to be produced for high resolution printing, without necessitating very small diameter orifices for producing such ink droplets 304. Also, the present invention permits larger orifices to be used in ejecting pigmented inks, thereby reducing the clogging problems associated wth such inks. Accordingly, fabrication problems, orifice clogging problems, and other problems in the prior art are avoided. Although particular embodiments of the present invention method for operating an ink jet apparatus for producing high resolution printing have been shown and described, other embodiments, which fall within the true spirit and scope of the appended claims may occur to those of ordinary skill in the art.

What is claimed is:

1. A method for obtaining high resolution printing in operating an ink jet device having a chamber for containing ink, an orifice associated with the chamber, and transducer means coupled to said chamber, said transducer means being operable for selectively producing either an expansion or a contraction in the volume of said chamber, said method comprising the steps of:

(1) operating said transducer means to produce rapid expansion in the volume of said chamber; and (2) maintaining said expanded volume for a period of time sufficient for rapidly pulling back into said chamber from said orifice a meniscus of ink for forming a cusp shaped disturbance of said meniscus, thereby causing a relatively small droplet of ink to form and break off form said meniscus, said droplet being ejected or propelled out of said orifice.

2. The method of claim 1, wherein said first step further includes producing via the rapid expansion in the volume of said chamber a negative pressure disturbance of sufficient magnitude for exciting surface resonances within said meniscus, said surface resonances contributing to the formation of an unstable cusp on said meniscus.

3. The method of claim 2, wherein said second step further includes maintaining said expanded volume for a period of time greater than one-half cycle of a resonance frequency of said chamber.

4. The method of claims 1, or 2, or 3, further including after step (2), the step of operating said transducer means to produce a contraction in the volume of said chamber, thereby causing a positive pressure disturbance of low magnitude relative to said negative pressure disturbance to be produced within said chamber, said positive pressure disturbance causing ink to flow from said chamber to said orifice for forming a meniscus at said orifice, thereby priming said ink jet for ejecting another ink droplet via steps (1) and (2).

5. The method of claim 4, further including the step of maintaining the magnitude of said positive pressure disturbance below a level which if exceeded would cause a droplet of ink to be ejected from said orifice.

6. A method for obtaining high resolution printing in operating an ink jet device having a chamber for containing ink, an orifice associated with the chamber, and transducer means coupled to said chamber, said transducer means being operable for selectively producing either an expansion or a contraction in the volume of said chamber, thereby creating either a negative or positive pressure disturbance, respectively, within said chamber, said method comprising the steps of:

(1) operating said transducer means for contracting the volume of said chamber for pushing ink toward said orifice, thereby initiating the formation of a meniscus of ink at the face of said orifice of said ink jet;

(2) operating said transducer means to produce rapid expansion in the volume of said chamber; and (3) maintaining said expanded volume for a period of time sufficient for rapidly pulling back into said chamber from said orifice a meniscus of ink for forming a cusp shaped disturbance on said meniscus, thereby causing a relatively small droplet of ink to form and break off from said meniscus, said droplet being ejected or propelled out of said orifice.

7. The method of claim 6 further including the step of controlling the operation of said transducer means in step (1) for preventing the ejection of a droplet of ink from said orifice.

8. The method of claims 6 or 7 further including the step of reversing the order of steps (1) and (2), for first ejecting a droplet of ink followed by priming for forming a meniscus of ink at the face of said orifice.

9. A method for obtaining high resolution printing in operating an ink jet device having a chamber for containing ink, an orifice associated with the chamber, and means for selectively expanding or contracting the volume of said chamber, said method comprising the steps of:

(1) operating for a small period of time said ink jet device for expanding the volume of said chamber to rapidly draw a meniscus of ink away from said orifice toward said ink chamber in a manner to excite surface resonances within said chamber for causing a small ink droplet to break off from the meniscus and be ejected from said orifice.

10. The method of claim 9 further including the step of (2) operating said ink jet device for contracting the volume of said chamber in a manner forcing ink to move to and from a meniscus at the orifice.

11. The method of claim 10, further including in step (2), the step of controlling the rate of contraction of the volume of said chamber for either ejecting a droplet of ink or preventing the ejection of a droplet of ink.

* * * * *